United States Patent Office 3,836,456
Patented Sept. 17, 1974

3,836,456
TREATMENT FOR WASTE WATER OR THE LIKE
Hjalmar Elias Fries, Spanga, Sweden, assignor to ITT
Industries, Inc., New York, N.Y.
Filed Dec. 11, 1972, Ser. No. 314,139
Claims priority, application Sweden, Dec. 14, 1971,
15,983
Int. Cl. C02b 1/20; C02c 5/04
U.S. Cl. 210—16                                  4 Claims

ABSTRACT OF THE DISCLOSURE

Water clarification and/or purification is achieved by establishing, in a first tank, vertically spaced floating and sunken sludge layers separated by a water layer that clears over a period of time. The raw waste is aerated in a second tank and thereafter withdrawn therefrom and injected with a precipitation agent including, but not limited to, a solution of aluminum sulfate into the clarified water layer at a vertical location spaced from both of the sludge layers. After the injection step is completed, the first tank is allowed to stand for the said period so that the water layer can again clear. At least a portion of the clarified water in the water layer is then removed therefrom at a vertical location between and spaced from the reformed sludge layers. The above-described steps may then be repeated, if desired. The stratification of all three layers is fairly continuous except that the water layer must, over spaced periods, be allowed time to clear. Either one of the sludge layers may be drained off whenever the thickness of the said one sludge layer becomes so great in comparison to the first tank depth only an inefficiently small batch of the aerated waste water can be pumped into the first tank and can thereafter be clarified.

BACKGROUND OF THE INVENTION

This invention relates to the arts of fluid purification and/or clarification, and more particularly, to a method of purifying and/or clarifying waste water or the like.

Purification and/or clarification is conventionally a difficult problem because many solids remain in an aqueous suspension almost indefinitely and move at random or remain in stationary positions randomly distributed throughout the entire volume of a quantity of waste water. Conventional treatments including, but not limited to, those utilizing precipitation agents invariably fail to clear the waste water adequately.

SUMMARY OF THE INVENTION

In accordance with the method of the present invention, the above-described and other disadvantages of the prior art are overcome by first aerating raw waste water in a first tank, and then injecting it with a precipitation agent into a clarified water layer in a second tank, which water layer separates a floating sludge layer from a sunken sludge layer.

The injection is made at a vertical location spaced from both sludge layers, whereby the sludge layers remain substantially undisturbed.

Immediately after the injection, due to the aeration, some sludge will rise to and fall to the floating and sunken sludge layers, respectively, from the water layer which is clouded by the injection. The water layer, over a period of time, thus becomes clear and can be removed, if desired, at a vertical location which is the same as that at which the aerated waste water and precipitation agent is injected. Portions of or all of either one of the sludge layers may be drained off, as desired.

The aeration causes a large number of the solids in suspension to help in forming the floating sludge layer.

The precipitation agent helps in forming the sunken sludge layer.

The combination of the aeration and stratification steps makes it possible, with a reasonably short elapse of time, to obtain water which is far clearer than it was possible to produce with any prior art method.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
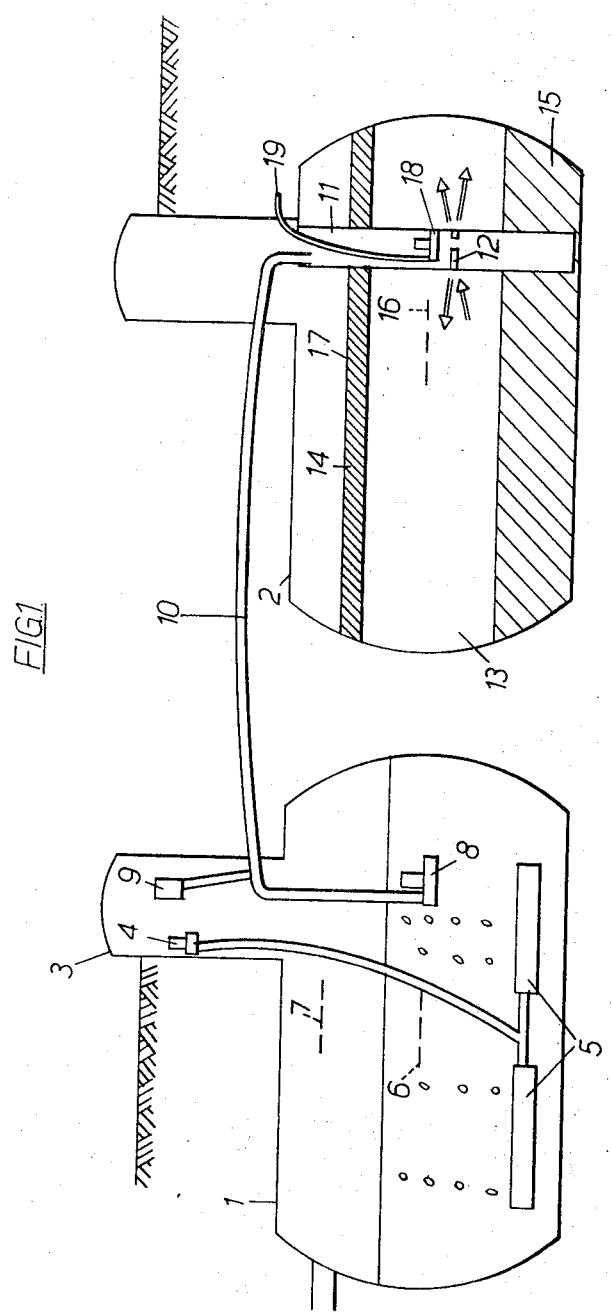
FIG. 1 is a diagrammatic view of apparatus with which the method of the invention may be practiced.

By active sludge purification of waste water organic elements are oxidized to carbon dioxide and water. Some of the organic elements are converted into new microorganisms. Thus the quantity of active sludge in a plant increases continuously. At the same time, the average sludge age grows. Sludge must be drained off periodically in order to keep the waste water treatment efficient. The treatment efficiency otherwise declines for several reasons. For example, at least a portion of the recently formed sludge invariably escapes through the outlet. The relationship between the total quantity of working sludge in a plant and the daily addition of organic material determines the average sludge age. At a sufficiently high age, i.e. an age of seven days at a temperature over 12° C. and a pH of 7–9 as a rule, it has been found that, among other things, the bacteria Nitrosomonas and Nitrobacts are originated in the active sludge. These bacteria have the power to oxidize the nitrogen which exists in the form of ammonia according to the formula:

Organic substance+$NH_4$+$O_2$→
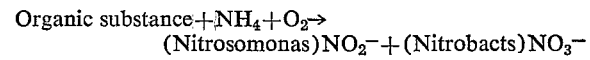
(Nitrosomonas)$NO_2^-$+(Nitrobacts)$NO_3^-$ This reaction, i.e. nitration, takes place in almost all long time aerators if they are protected against refrigeration.

This reaction is favored by a high oxygen percentage and cannot take place by an oxygen percentage below 0.5 milligrams/liter. If the oxygen percentage decreases below that point, it has been found that the number of the nitrate ions is reduced by, among others, the bacteria Pseudomonas and Acromobacts, for instance according to the formula:

$NO_3^-$+organic substance→$N_2O$→$N_2$

The thus produced $N_2O$ and the nitrogen gas have only a slight solubility in water and, therefore, escape in the form of small bubbles. These bubbles lift the active sludge to the surface of the fluid in which the solids forming the active sludge might otherwise be randomly distributed throughout the volume thereof. During the first hours, the solids in the sludge fall to the bottom of the tank holding the said fluid. However, after a period of time has elapsed, the solids rise up to the fluid surface. This takes place when the dissolved oxygen has been consumed and the above-described denitration has began to take place. After some time, the gas bubbles escape and all of or a part of the sludge sinks to the bottom of the tank. During the final phase of the denitration, at least some of the sludge will rise and fall repeatedly. The rising and falling sludge thus causes an extremely serious clarification problem.

Long time aerators are known as stable and simple purification plants. The purification values are as a rule very good and the outlet water is resistant to putrefaction when the nitrogen exists in an oxidized form. The process has two disadvantages compared to purification plants with a lower sludge age. Firstly, the amount of phosphorous reduction is small, partly because relatively little phosphorous-holding surplus sludge is produced in the plant. Secondly, changes in predominant populations take place. This is caused by the ecologically complicated composition changes in the sludge, which composition changes cause deteriorated flocculation. This sometimes causes finely dispersed sludge to pass through the outlet. A third disadvantage, which has nothing to do with the process but is related to its use by small plants which often do not get enough service, is that the plant is allowed to get so filled with surplus sludge that the more recent sludge passes through the outlet.

The finely dispersed sludge and the surplus sludge which pass through the outlet because of inadequate sludge dumping are, in many plants, collected in post sedimentation devices, i.e. sludge extractors, after the sludge has passed thereto from the normal sedimentation chamber. However, in the past, sludge extractors have functioned very badly because of the above-mentioned problem of the nitrating sludge rising and sinking by turns.

It should be observed that in an active sludge plant there are always fewer quantities of nitrating as well as denitrating bacteria. If finely dispersed sludge or surplus sludge are allowed to escape through the outlet, these bacteria accompany the sludge to the sludge extractor. The nitrating bacteria will, in the extractor, be blocked because of insufficient soluable oxygen. This state is rapidly reached whereas, on the other hand, the denitrating bacteria have been previously prepared for their activity in the sedimentation chamber.

Dut to the propensity of the sludge to rise and sink by turns, the flocced sludge is, at once, pumped with a phosphorous flocculation agent to a separate sludge container.

The structure of a plant constructed in accordance with the present invention is shown in FIG. 1 where a first tank 1 and a second tank 2 are provided. The tank 1 has a shaft 3 with a fan 4 which blows air through the aerators 5. In the water and the sludge in tank 1, the oxidating reaction takes place during simultaneous filling of the tank 1 from its lowest level indicated at 6 to its highest level indicated at 7. When the latter level has been reached, the sludge is permitted to settle and the clear water is pumped out by, for instance, a submersible pump 8 to the tank 2. At the same time, a metering pump 9 pumps in a precipitation agent in a certain relationship to the pumped water. The mixture is pumped through a pipe 10 to a mixture- and protection-tube 11 in tank 2. The tube 11 has slots 12 through which the water streams out into a water layer 13 located between a floating sludge layer 14 and a sunken sludge layer 15. The tank 2 may, if desired, have been earlier emptied to a lowest level 16. During the pumping, the level may go up to the highest level 17, whereby the floating sludge layer rises as a single integral layer. The water which is pumped into the water layer 13 may there form flocs and denitrate. After separation, the clear water is pumped out through the slots 12 by the pump 18. The water is pumped out through an outlet pipe 19 to a recipient or receptacle.

In the plant which is shown in FIG. 1, the floating sludge is prevented from being pumped out by the protection given by tube 11. However, this may, in addition, be prevented for instance by using a level control device which stops the pump before the floating sludge deposit falls to the level of the pump inlet.

As stated previously, the biologically treated water is, during the pumping step, mixer with a precipitation agent. This agent step may be, for example, an aluminum sulfate solution. In the pumped water, flocs will appear which partly consists of the aluminum hydroxide (if aluminum sulfate is used) with the phosphorous closely bound to it, and partly an organic flocculation which is not so closely bound to the chemical flocculation. The organic flocculation consists of the above-mentioned finely dispersed sludge which eventually becomes the surplus sludge. Thanks to the fact that denitrating bacteria follow from the tank 1 and that there is much nitrate in the water, a denitration of the organic sludge takes place. During one or two hours, a separation takes place so that the organic sludge goes up to the surface with the aid of the $N_2O$ and nitrogen gases, whereas the mainly organic aluminum hydrate sludge sinks to the bottom. Thus the layer between these two sludge layers becomes clear and may be pumped out. The sludge which is lifted by the denitration is packed together with the earlier floating sludge layer and the recently originated gas bubbles contribute to keep the sludge layer 14 floating. A small quantity of aluminum hydrate sludge will, of course, go up in the flotation and that helps to tie the floating sludge layer together in a single coherent mass. This mass does not drop sinking sludge to the clear water below.

Figure 2:
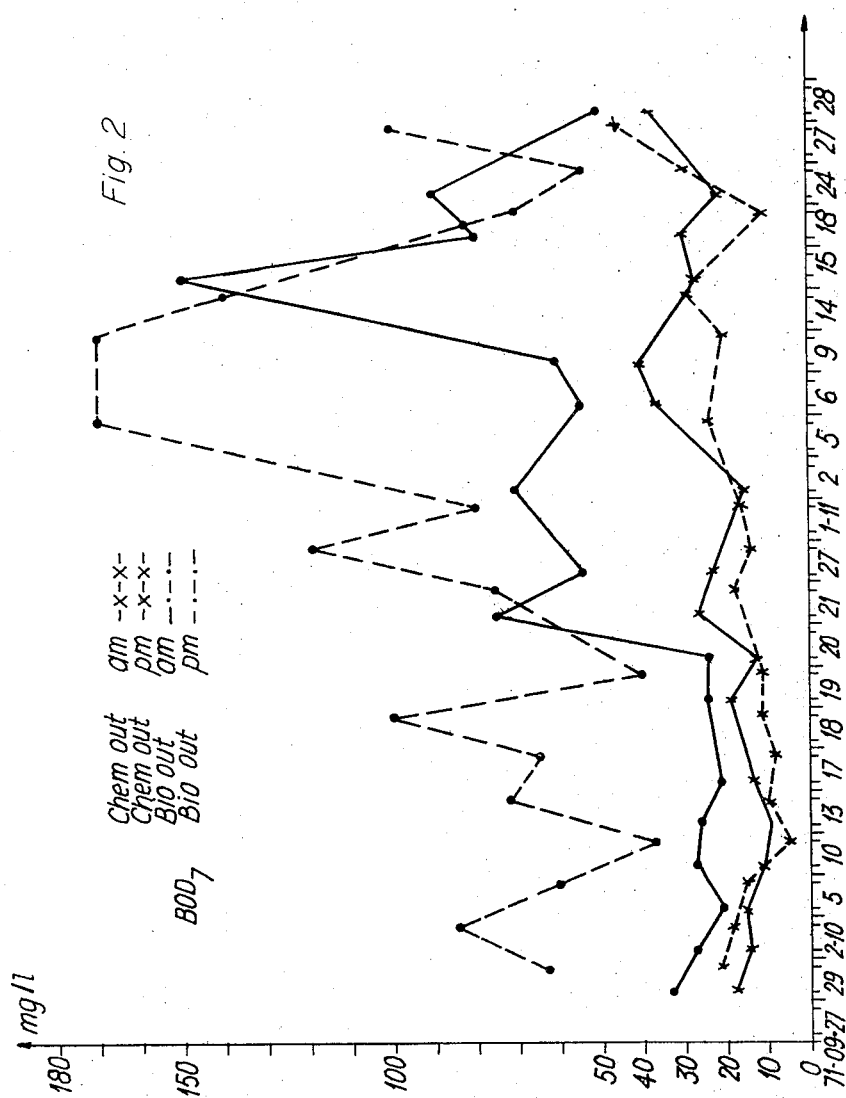
FIGS. 2, 3, 4 and 5 are graphs of operating characteristics of the method of the present invention.
Figure 3:
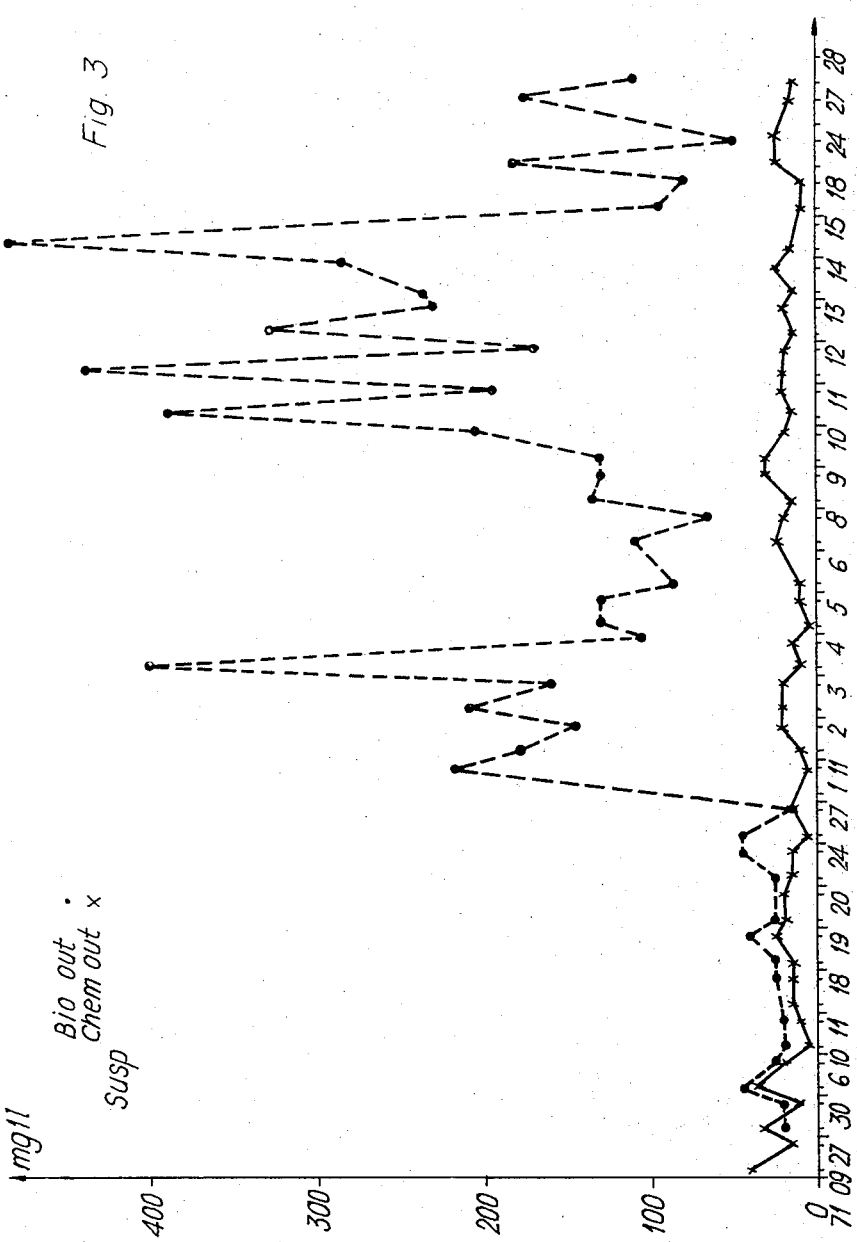
Figure 4:
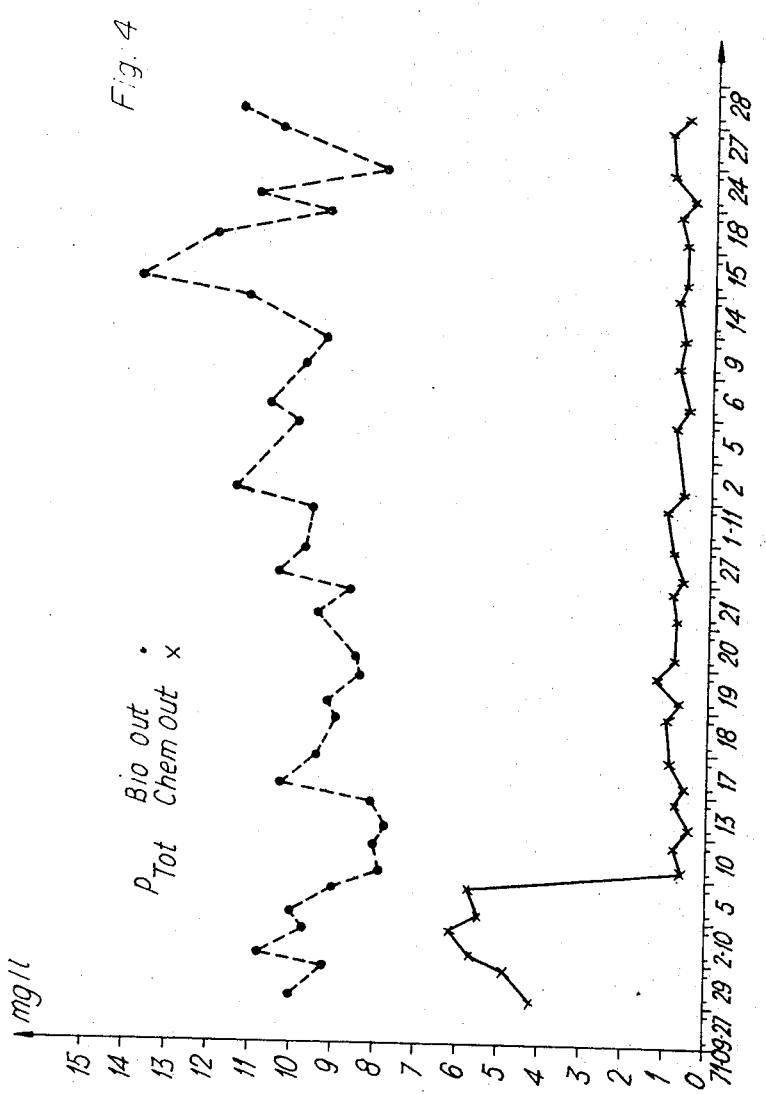
Figure 5:
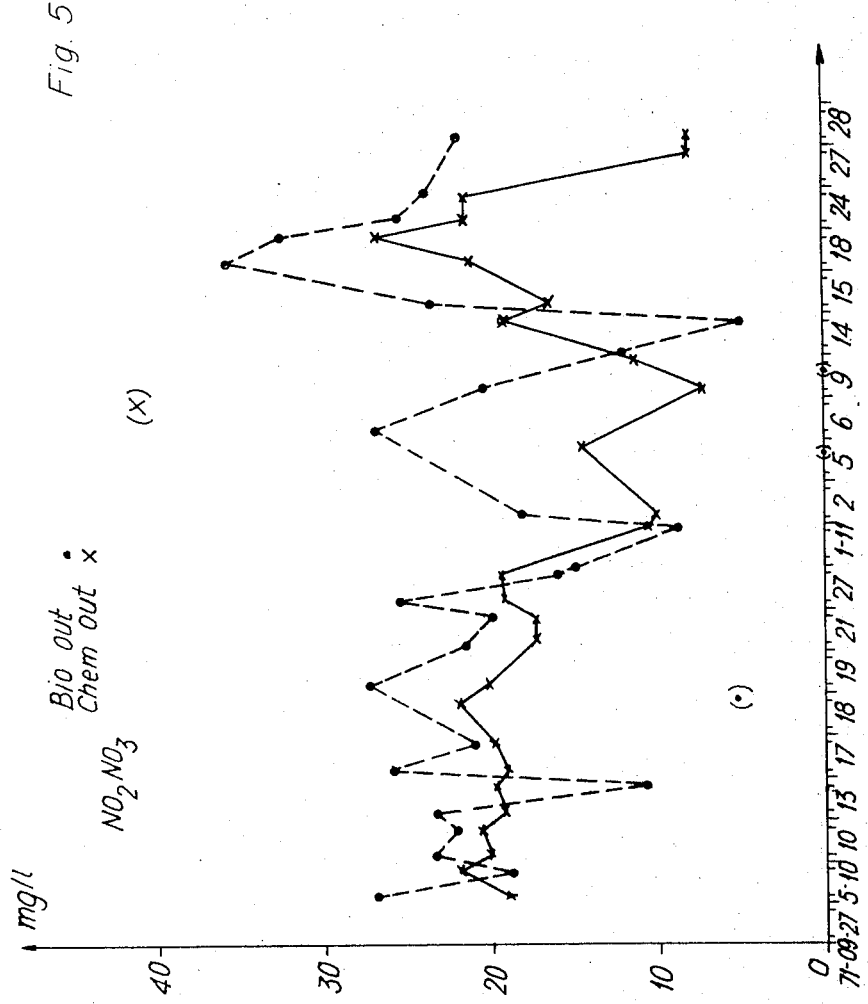

FIG. 2 shows BOD (Biological Oxygen Demand) in the outlet from the tanks 1 and 2, respectively. FIG. 3 shows the quantity of suspended material in the outlets from the two tanks 1 and 2. FIG. 4 shows the total quantities of phosphorous, and FIG. 5 shows the concentrations of oxidized nitrogen in the outlets from the two tanks 1 and 2.

FIG. 2 shows the varying BOD at the outlet from the tank 1 and the BOD at the outlet from the tank 2, respectively, caused by enclosed finely dispersed and surplus sludge, respectively. Leaking of the BOD from the aerator chamber sludge is considerable when the aerators do not contribute oxygen. Increases in the BOD in the water are set forth below.

$BOD_5$ by tests which have been kept without and with active sludge at different temperatures.

| State | $BOD_5$ without sludge | $BOD_5$ with sludge |
|---|---|---|
| 6 hours plus 23° C | 23 | 77 |
| 24 hours plus 23° C | 21 | 146 |
| 6 hours plus 7° C | 24 | 53 |
| 24 hours plus 7° C | 20 | 89 |
| 24 hours—19° C | 23 | 225 |

FIG. 2 shows low BOD by outgoing water from the tank 2 compared to BOD of incoming water to the tank 2 and shows that the type of leaking BOD, which is normall feared after precipitation, does not take place.

FIG. 3 shows quantities of suspended material in the outlets during a two months' test period during which half the time surplus sludge from the tank 1 was permitted to pass to the tank 2. The low values of suspended material after the tank 2 show that any sludge wandering between the floating sludge layer and the sunken sludge layer has not taken place, at least not to such extent that it could have influenced the quantity of the outgoing water. By taking out water plugs (not shown), the sludge layers and clear water between them could be examined. The sunken sludge layer typically has a light brown color. The dividing line between sludge and water is sharp. The floating sludge deposit typically has a black color and the dividing line between the floating sludge and the water is very sharp. The water layer between was totally free from suspended material. Thus, differentiation and stabilization takes place in the intended way. FIG. 4 shows that the presence of the organic surplus sludge and the finely dispersed sludge have not decreased the phosphorous floccing. FIG. 4 shows the quantity of phosphorus in mg./l. after the tanks 1 and 2, respectively. The reason why the results got better between the 7th and 8th of October was that the quantity of the floccing agent was increased. This increase was decided upon because it was discovered that the outlet from the tank 1 contained considerable phosphorous.

In the description of the operation of tank 2, a description has been included as to how the denitration is used to keep the floating sludge on the water surface. However, the denitration also is advantageous for hydrogen reduction in the plant. It may be possible to utilize this advantage to the extent that an amount equal to or greater than about 20 percent nitrite and nitrite bound hydrogen may be reduced and allowed to escape in gas form. This is shown in FIG. 5.

Denitration may be improved in a number of ways. Denitrating bacteria, for example, can be placed on bars for instance which can be arranged in the tank 2 near the instreaming water, if desired. Another good way to further improve the denitration is to add methanol or an equivalent thereof as well as aluminum sulfate to the clarified water which is pumped to tank 2. Pump 9 can, therefore, add both of these ingredients simultaneously, if desired.

In the aeration step, the range of rates of volume flow of air per unit volume of waste water is by no means critical. However, this value is preferably between about 30 to 60 cubic meters of air per cubic meter of waste water, where the waste water is at a normal strength of 200 to 300 grams $BOD_5$/liter.

The following ranges and materials are set forth by way of example. The present invention is, therefore, by no means limited to anything contained in any one or more or all of the following paragraphs.

For example, air may be injected for a period of from between about 10 to 20 hours, or 10 hours per cycle. However, the invention is not limited to these figures.

As an example only, the time between when the air injection is terminated and the clarified water is pumped between sludge layers may be about 30 to 120 minutes. Typically, this time is 90 minutes.

The aluminum sulfate may be employed in a concentration preferably between about 30 and 50 percent.

If desired, $Al_2(SO_4)_3$ may be employed in an amount of between about 150 and 300 milligrams per liter of the raw waste water. This figure typically is 200 milligrams per liter of raw waste water.

Typical workable bacteria for denitrification (nitrate dissimilation) are micrococcus, pseudomonas, denitrobacillus, spirillum, macillus and acromobacter.

Examples of precipitation agents are aluminum sulfate, ferric chloride and polyelectrolytic flocculants. A combination of ferric chloride and lime may also be employed, if desired.

What we claim is:

1. The method of clarifying sewage waste water, said method comprising the steps of: depositing a quantity of the waste water in a first tank; contacting the waste water in the first tank with air to aerate the same; transporting the aerated waste water to a second tank having distinct stratified first, second and third layers therein, said first and third layers being upper and lower vertically spaced sludge layers, respectively, said second layer being an intermediate, clarified layer of water located between said upper and lower sludge layers, said upper sludge layer being located vertically above said clarified water layer; injecting the transported aerated waste water with a precipitation agent directly into the said clarified water layer; and, after at least some of the said injected water has clarified, removing clarified water from said second tank at a vertical location therein between upper and lower sludge layers which are reformed therein some time after said injection.

2. The method as defined in Claim 1, wherein methanol is injected into said clarified water layer with said transported aerated water and said precipitation agent.

3. The method as defined in Claim 2, wherein said precipitation agent includes aluminum sulfate.

4. The method as defined in Claim 1, wherein said precipitation agent includes aluminum sulfate.

References Cited

UNITED STATES PATENTS

| | | | |
|---|---|---|---|
| 3,637,490 | 1/1972 | Gardner et al. | 210—44 |
| 3,666,663 | 5/1972 | Walker | 210—49 |
| 3,576,738 | 4/1971 | Duffy | 210—50 X |
| 3,617,540 | 11/1971 | Bishop et al. | 210—18 X |
| 3,709,364 | 1/1973 | Savage | 210—8 X |
| 3,142,638 | 7/1964 | Blaisdell et al. | 210—51 X |
| 2,428,418 | 7/1940 | Goetz et al. | 210—49 X |

SAMIH N. ZAHARNA, Primary Examiner

R. H. SPITZER, Assistant Examiner

U.S. Cl. X.R.

210—44, 49, 51